United States Patent [19]

Flotow et al.

[11] Patent Number: 4,601,377
[45] Date of Patent: Jul. 22, 1986

[54] CLUTCH ADJUSTMENT METHOD

[75] Inventors: Richard A. Flotow; Roger Z. Roth, both of Fort Wayne, Ind.

[73] Assignee: Dana Corporation, Toledo, Ohio

[21] Appl. No.: 314,269

[22] Filed: Oct. 23, 1981

[51] Int. Cl.$^4$ .............................. F16D 13/75
[52] U.S. Cl. .................... 192/110 R; 192/70.26; 192/70.29; 192/70.3; 192/99 A
[58] Field of Search .............. 192/70.26, 70.29, 70.30, 192/99 A, 110 R; 123/90.52

[56] References Cited

U.S. PATENT DOCUMENTS

| | | | |
|---|---|---|---|
| 1,868,675 | 7/1932 | Spase . | |
| 1,935,678 | 11/1933 | Valpey . | |
| 1,984,231 | 12/1934 | Parker et al. . | |
| 1,995,738 | 3/1935 | Fish . | |
| 2,021,973 | 11/1935 | Wemp | 192/103 A |
| 2,038,017 | 10/1934 | Wemp | 192/99 A |
| 2,044,067 | 6/1936 | Eldridge et al. . | |
| 2,044,818 | 6/1936 | Spase . | |
| 2,067,442 | 1/1937 | Frisz . | |
| 2,230,520 | 10/1938 | Wemp | 192/110 R |
| 2,277,273 | 5/1940 | Spase | 192/99 A |
| 2,599,982 | 6/1952 | Erwin . | |
| 2,863,432 | 12/1958 | O'Brien | 123/90.52 |
| 2,895,581 | 7/1959 | Lysett | 192/99 A |
| 2,966,901 | 8/1959 | Stwiorok | 123/90.52 |
| 3,061,922 | 12/1956 | Lysett | 29/464 |
| 3,215,233 | 6/1963 | Smith et al. | 192/70.3 |
| 4,321,894 | 3/1982 | Black | 123/90.52 X |

FOREIGN PATENT DOCUMENTS

| | | | |
|---|---|---|---|
| 0969882 | 6/1975 | Canada | 192/70.3 |
| 1213165 | 3/1966 | Fed. Rep. of Germany | 123/90.52 |
| 0456925 | 8/1935 | United Kingdom | 192/68 |
| 1251708 | 10/1971 | United Kingdom | 192/99 A |

OTHER PUBLICATIONS

"Slide Fastener", Steck Manufacturing Co., 1312 Bolander Ave., Dayton 8, Ohio, 11/1/56.

Primary Examiner—Rodney H. Bonck
Attorney, Agent, or Firm—Frank B. McDonald

[57] ABSTRACT

A method is disclosed for adjusting a plurality of release levers in a friction disc clutch. The method ensures that the inner or nose ends of the release levers lie in a common plane upon final clutch assembly. In a preferred form, rivets of varying head thicknesses are affixed to the nose ends of the release levers, one rivet per each lever, each selected according to an actually measured amount of axial deviation in the nose end to which it is to be affixed. Each rivet is preferably visually identifiable by color or other marking to indicate its specific head thickness, which corresponds to an expected deviation range. The invention therefore provides a mass production technique which ensures adjustment of inner nose ends of release levers during the assembly of a friction disc clutch, whereby the inner nose ends of the release levers thereof will lie in a common radially extending plane.

3 Claims, 3 Drawing Figures 4,601,377

CLUTCH ADJUSTMENT METHOD

BACKGROUND OF THE INVENTION

This invention relates to an improvement in the manufacture of friction clutches of the type employed in automotive vehicles, and more particularly to a method for precisely and rapidly adjusting the inner nose ends of associated clutch release levers.

In the prior art, adjustment of the release levers during assembly of the clutch has presented a continuing problem. Many ingenious techniques have been employed but most of them have been expensive and cumbersome to carry out. It is well understood by those skilled in the art that release levers in the clutch of an automotive vehicle should have durable inner nose surfaces which lie in a common plane. The release levers will only then engage the release bearing uniformly and simultaneously to insure that the pressure plate is maintained in a plane parallel to the flywheel. Excessive and uneven wear will thereby be eliminated, and the release of the clutch will be efficient and complete.

The variety of methods employed to achieve coplanar operation of the release lever inner nose ends have been unsuitable in the mass production of clutches. Such methods have lacked both economy and convenience. For example, in one instance the outer tail portions have employed adjustable threaded screws with locking jam nuts for use in connection with associated bosses on the back side of the pressure plate. Another method has utilized adjustable rivets, but has required a step of actually checking individual heights of the heads of the rivets with micrometers prior to locking them into final position.

To the extent that such release lever inner nose end adjustments are absolutely essential for proper operation of the clutch assembly, those adjustments have heretofore been necessarily carried out with great care and attendant expense.

SUMMARY OF THE INVENTION

The invention described herein provides an economic means for achieving coplanar disposition of the release lever inner nose ends during clutch assembly.

In a preferred method, rivets of varying head thicknesses are selected and installed on the inner nose ends of release levers during clutch manufacture. Each rivet is color coded, or contains a marking and/or other means for visually identifying its specific head thickness. All head thicknesses fall within an expected range of axial deviation of the inner noses as measured with the outer ends or tails of the assembled levers bottomed against the clutch pressure plate. A fixed gauge system is employed to ascertain an actual deviation measurement for each individual inner nose relative to a first radial plane. Rivets, each visually identifiable as having a specific head thickness corresponding to an actually measured deviation range, are selected and affixed, one to each inner nose, so that the head extremities of all installed rivets lie in a second plane parallel to the first radial plane.

DETAILED DESCRIPTION OF A PREFERRED METHOD

Figure 1:
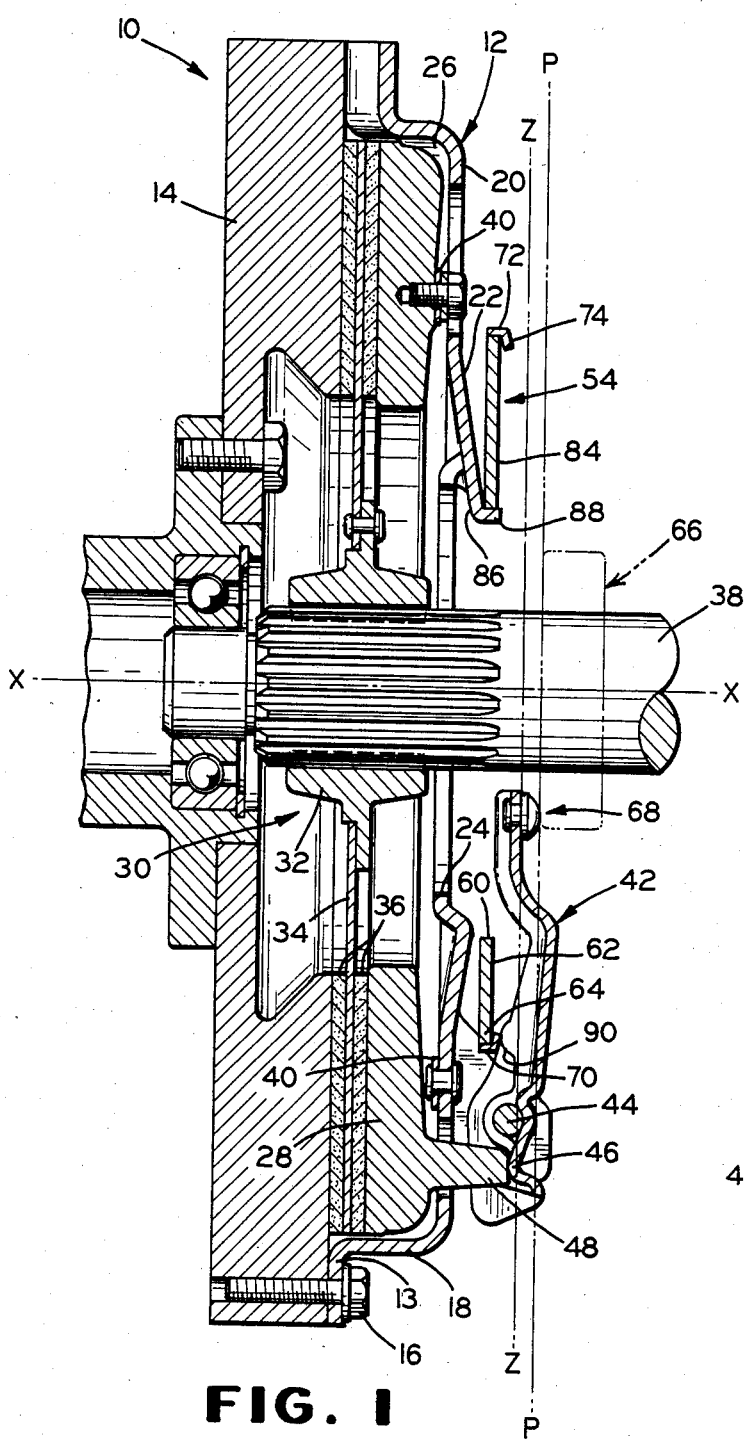
FIG. 1 is a cross section of a clutch employing the invention as described herein.

Referring to FIG. 1 of the drawings, a preferred method of this invention involves a friction clutch shown generally at 10 and having a central axis X—X. The clutch 10, comprises an annular cover 12, which includes a peripheral flange portion 13. The latter portion 13 is secured to the rear face of a standard flywheel 14 by a plurality of circumferentially spaced bolts 16, so that the cover 12 rotates with the flywheel 14. The cover 12 further comprises a rim portion 18 extending in a generally axial direction, and an end wall 20 extending radially inwardly from the rim portion 18 and terminating in an angularly disposed ramp 22. The radially inner portion of ramp 22 defines a central opening 24 in the end wall 20 of the cover 12.

An annular space 26 is provided between the flywheel 14 and the cover 12 for receiving a pressure plate 28. A driven disc 30 is adapted to be clamped between the pressure plate 28 and the flywheel 14.

The driven disc 30 comprises a central hub 32 having a support plate 34 secured thereto with friction facings 36 fastened on opposite sides of the support plate 34. The central hub 32 is splined to the outer end of a transmission input shaft 38 with the friction facings 36 positioned between the pressure plate 28 and flywheel 14. The splined connection permits the driven disc 30 to move freely in an axial direction relative to the input shaft 38 while being rotatable with it. The pressure plate 28 is axially movable into engagement with driven disc 30 to clamp the same against the flywheel 14 for drivingly connecting the rotatable drive and driven members of the clutch. A plurality of circumferentially spaced drive straps 40 rotatably connect the pressure plate 28 to the cover 12 and permit limited axial movement of the pressure plate 28 relative to the cover 12. The straps 40 further serve as a means to lift the pressure plate 28 away from the flywheel when the clutch 10 is actuated to its disengaged position. The opposite ends of the drive straps 40 are connected to both the cover 12 and the pressure plate 28 in a conventional manner.

A lever operating mechanism is provided to move the pressure plate 28 axially relative to the cover 12 and into and out of engagement with the driven disc 30. The lever operating mechanism is disposed wholly outside the cover 12, and comprises a plurality of radially extending levers 42 pivotally connected to the cover 12 by pivot pins 44. Outer or tail ends 46 of each lever 42 engage integral bosses 48 formed on the pressure plate 28.

Resilient means 54 are provided to apply an axially engaging force to the pressure plate 28 to normally urge the same into clamping engagement with the driven disc 30. The resilient means is preferably designed to maintain a substantially constant pressure regardless of wear on the driven disc friction facing 36. In a preferred embodiment, the resilient means 54 is an annular Belleville spring 54, compressed between the cover 12 and the levers 42. The Belleville spring 54 in its unstressed state is conical in shape, having an inner peripheral portion 60, an intermediate cone-shaped portion 62, and an outer peripheral portion 64. Inner and outer peripheral portions 60 and 64 are axially spaced and approach the same plane as the spring 54 is placed under compression, the spring being designed to have a fixed inner peripheral portion 60 react against the cover 12, and a moveable outer peripheral portion 64 engage and be movable with the levers 42. Because of the spring movement, the cover ramp 22 is angled to permit clearance during operation.

The levers 42 are arranged to be depressed against the action of the spring 54 by a throw-out bearing 66 operating against inner or nose ends 68 of the levers 42. Operation of the throw-out bearing 66 causes the levers 42 to pivot about the pins 44. The outer ends 46 respond by moving the pressure plate 28 clampingly against the driven disc 30 to force same against the flywheel 14.

To equally distribute load from the spring to the levers 42, an annular collector ring 70 is provided. The collector ring 70 is cup-shaped in cross-section, and comprises an annular, axially extending rim 72 which encircles the outer peripheral portion 64 of spring 54, and has a radially inwardly extending annular base 74. The base 74 is adapted to be positioned between the back face of spring 54, and adjacent the front face of the levers 42. Thus, the base 74 is disposed for transfering the reaction load of the spring 54 to the levers 42, and is disposed at a slight angle to provide clearance for the outer peripheral portion 64 when the levers 42 are pivoted to their clutch disengaged position. The collector ring 70 has sufficient clearance with respect to the outer peripheral portion 64 to permit it to move freely during the various clutch operating stages. Since the levers 42 are in constant contact with the collector ring base 74, they serve to hold the collector ring 70 in place against the spring 54. If desired, the spring 54 may bear directly against the levers 42; however, an equal distribution of the load will result from employment of the annular collector ring 70.

The outer peripheral portion 64 of the spring 54 is encircled by the collector ring 70 as described. The inner peripheral portion 60 contains a plurality of inwardly extending tongues 84. The tongues 84 are uniformly spaced apart, each tongue 84 extending into a corresponding recess 86 which in turn extends inwardly from the ramp 22. Each recess 86 contains side walls (not shown), and a lip 88 for a secure non-slipping engagement of the inner peripheral portion 60 of the spring 54 and the cover 12.

The operation of the clutch described is that of a conventional "push-type" clutch. Thus, in the normally engaged position of the clutch, the tongues 84 of the spring 54 will react in the recesses 86 of the cover 12. The outer periphery 64 of the spring 54 will urge the collector ring 70 axially outwardly against intermediate noses 90 of the levers 42. The levers 42 will then pivot about pins 44 and the outer ends 46 will exert an axially inward force against the pressure plate 28 through the pressure plate bosses 48.

To disengage the clutch, an operator will typically depress a clutch pedal with his left foot. This action will cause the throwout bearing 66 to move axially inwardly against the inner ends or noses 68 of the levers 42. The intermediate noses 90 will then urge the collector ring 70 axially inwardly, thus collapsing the spring and causing inner and outer peripheral portions 60 and 64 thereof to lie in a common plane. The levers 42 will pivot about pins 44, and the outer ends 46 thereof will release the axial pressure previously held against the pressure plate bosses 48.

Figure 2:
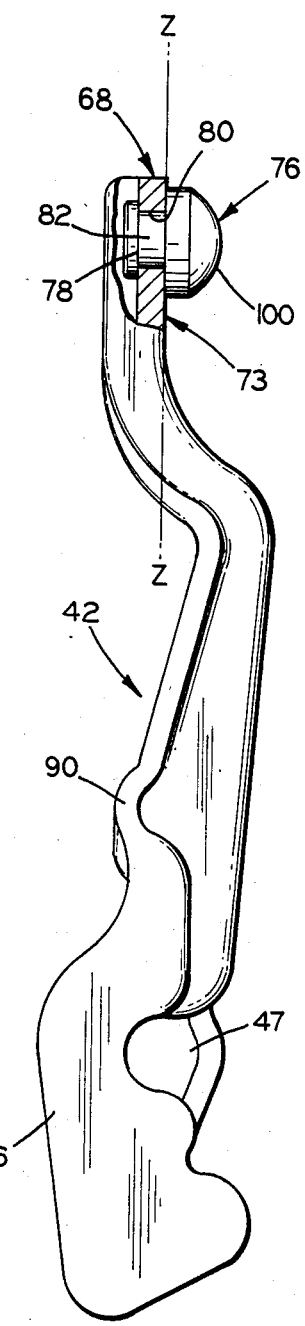
FIG. 2 is a side view partly in section of a release lever employed in the clutch of FIG. 1.

Referring now to FIG. 2, a preferred embodiment of a clutch lever 42, as employed in the aforedescribed clutch, includes an inner nose end 68, an outer or tail end 46, and an intermediate nose 90 therebetween. The lever 42 is preferably comprised of a steel stamping, and includes a transversely extending bore 47 about which the lever 42 pivots on the aforementioned pin 44.

A plurality of such levers 42 each include a non-integral boss 76 (as distinguished from the preferred integral form of the pressure plate bosses 48), preferably a rivet, secured to each of the inner nose ends 68 thereof. The shank end 82 of each rivet 76 is preferably inserted into a bore 80 in the inner nose end 68 of each clutch lever 42. Per conventional rivet installation practice, a lock nut 78 may then be affixed to that portion of the inserted shank end 82 which extends from the backside of the bore 80.

It may now be appreciated that the adjustment of the ends of the inner noses 68 of the release levers 42 so that they lie in a common radially extending plane is extremely important for achievement of an evenly and fully radially distributed clutch loading. Otherwise, the clutch will not engage and disengage smoothly, nor will the ends 68 wear evenly. Thus, the method of this invention provides a means for adjusting the inner noses 68 during assembly of the clutch.

Figure 3:
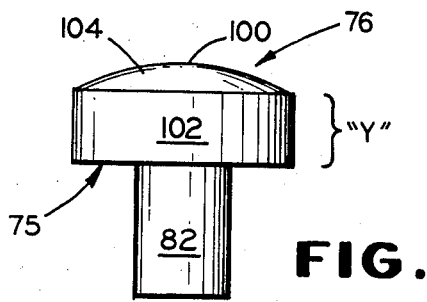
FIG. 3 is a view of a rivet as employed in the release lever of FIG. 2.

Preferably, a plurality of rivets 76 (FIG. 3) having heads 75 of varying heights or thicknesses "Y" are employed for this purpose. The head thicknesses "Y" correspond to specific ranges of expected deviation of the inner noses 68 (FIG. 1) relative to a radially extending plane Z which passes through the line Z—Z, as shown herein for reference. For ease of application of the method, the head thicknesses "Y" are identifiable without resort to measurement, preferably by visual appearance, as for example by color or other marking on the head 75 and/or shank 82 of each rivet 76.

Other markings as envisioned hereunder would include stampings of numbers or other identifying logos or symbols, including letters. Alternatively, the marks could be identifiable by other than visual means, for example, by electronically or photosensitively identified markings, as appropriately employed on an automated assembly line.

Actual deviation of each individual inner nose 68 of each installed release lever 42 may be measured by reference to the plane Z via the use of a standard clutch assembly fixture, as will be appreciated by those skilled in this art. Relative movement is therein effected between the clutch cover 12 and the pressure plate 28, to cause the outer ends 46 of the levers 42 to be bottomed against the pressure plate bosses 48. Although not shown, a fixed gauge or dial indicator system, which uses the plane Z as a reference for measurement, is employed to obtain the actual deviation measurement of each inner nose 68. A dial reading is obtained along the radially extending head-receiving surface 73 on each inner nose.

For each dial reading, a rivet 76 is selected which corresponds to the head thickness "Y" as required to insure that all extremities 100 of each head 76 will lie in a common plane "p" which passes through line "p—9" (FIG. 1), and which is parallel to the reference plane Z.

In the preferred practice of this invention, the head 75 of each rivet is comprised of cylindrical and crown portions 102 and 104, respectively. Ideally, each of the rivets contain a standard crown radius measurement, wherein all variations in head thicknesses "Y", and indeed the lengths of each rivet, exist only in the cylindrical portion 102.

Also in the preferred practice for simplicity, only five to ten colors or markings would be employed over a deviation range of one hundred fifty thousandths of an inch. Thus, a different colored rivet would be selected for each range of deviation reading, each range having an acceptable deviation span of fifteen to thirty thousandths. Typical dimensions of the rivet 76 would, include, for example, a crown radius in the range of 200 to 250 thousandths, while head thicknesses "Y" would range from 200 to 350 thousandths.

What is claimed is:

1. A method of adjusting a friction clutch, said clutch including a cover, a plurality of radially extending levers axially moveable relative to said cover, each of said levers having an inner nose portion defining an axially extending extremity, and engageable with a clutch throwout bearing; said clutch further including a pressure plate axially adjacent said cover, and pressure means for axially biasing said pressure plate away from said cover; said method comprising the steps of:
    (a) effecting relative axial movement of said pressure plate toward said clutch cover against bias of said pressure means, wherein said axially extending extremity of each of said inner nose portions lies within a pre-determined axial range relative to a first radially extending plane,
    (b) measuring the distance between said axially extending extremity of each of said inner nose portions and said plane,
    (c) providing a plurality of bosses having varying lengths corresponding to said pre-determined axial range, wherein each of said lengths is identifiable without actual measurement,
    (d) selecting, from among said plurality of bosses, a boss corresponding to each of said inner nose measurements, and
    (e) affixing said selected bosses to each of said inner nose portions of said plurality of levers, whereby an axially extending extremity of each of said bosses then lies within a common plane parallel to said first plane.

2. A clutch comprising a cover, a plurality of radially extending levers moveable relative to said cover, an axially extending boss on the radially inner end of each lever, a throw-out bearing engageable with each of the said bosses, wherein said bosses are of pre-selected thicknesses and comprise rivets, each of said rivets having a head and a shank, said head comprising a cylindrical body portion and a crown portion, said crown portion defining an axially extending extremity, wherein said thicknesses of said bosses vary only with respect to the heights of said cylindrical body portions.

3. The clutch of claim 2, wherein said cylindrical body portions of said rivets bottom against the axially extending extremities of said inner noses of said levers.

* * * * *